United States Patent
Andersen

(10) Patent No.: US 12,378,480 B2
(45) Date of Patent: Aug. 5, 2025

(54) PROCESS FOR OPERATING SULFIDED HYDROPROCESSING CATALYST

(71) Applicant: TOPSOE A/S, Kgs. Lyngby (DK)

(72) Inventor: Stefan Andersen, Værløse (DK)

(73) Assignee: TOPSOE A/S, Kgs. Lyngby (DK)

( * ) Notice: Subject to any disclaimer, the term of this patent is extended or adjusted under 35 U.S.C. 154(b) by 0 days.

(21) Appl. No.: 18/256,486

(22) PCT Filed: Dec. 16, 2021

(86) PCT No.: PCT/EP2021/086244
§ 371 (c)(1),
(2) Date: Jun. 8, 2023

(87) PCT Pub. No.: WO2022/129361
PCT Pub. Date: Jun. 23, 2022

(65) Prior Publication Data
US 2024/0026232 A1     Jan. 25, 2024

(30) Foreign Application Priority Data

Dec. 17, 2020   (EP) .................................... 20214874

(51) Int. Cl.
*C10G 45/26* (2006.01)

(52) U.S. Cl.
CPC ..... *C10G 45/26* (2013.01); *C10G 2300/1022* (2013.01); *C10G 2300/202* (2013.01); *C10G 2300/4081* (2013.01); *C10G 2300/70* (2013.01)

(58) Field of Classification Search
CPC .... B60W 10/10; B60W 10/115; B60W 10/18; B60W 10/184; B60W 30/18136;
(Continued)

(56) References Cited

U.S. PATENT DOCUMENTS

| 2009/0300970 A1* | 12/2009 | Perego | C10L 1/08 44/307 |
| 2015/0014216 A1* | 1/2015 | Sundararaman | C10G 45/16 208/49 |
| 2016/0053183 A1* | 2/2016 | Eizenga | C10G 3/50 585/277 |

FOREIGN PATENT DOCUMENTS

| EP | 2684938 A2 | 1/2014 |
| EP | 2684938 B1 * | 2/2018 ............... C10G 3/50 |

OTHER PUBLICATIONS

European Search Report issued in corresponding Patent Application No. EP 20 21 4874 dated May 31, 2021.
(Continued)

*Primary Examiner* — Ellen M McAvoy
*Assistant Examiner* — Chantel Graham
(74) *Attorney, Agent, or Firm* — Boone IP Law

(57) ABSTRACT

A broad aspect of the disclosure relates to a process for hydroprocessing of a hydrocarbonaceous feedstock stream comprising the steps of
  directing said hydrocarbonaceous feedstock stream to contact a material catalytically active in hydroprocessing thus providing a hydroprocessed stream
  separating said hydroprocessed stream in a purified hydrocarbon stream, sour water and a separation off-gas,
  separating said sour water in a purified water stream and sour stream, directing said sour stream as a liquid sour recycle stream either to contact said material catalytically active in hydroprocessing or to be combined with said hydroprocessed stream prior to step b,
  said material catalytically active in hydroprocessing comprising at least one base metal from Group 5, 8, 9 or 10 of the periodic table in sulfided state.

(Continued)

This has the benefit of minimizing or even avoiding the need for addition of sulfur to keep the catalytically active material in the active sulfided state.

13 Claims, 2 Drawing Sheets

(58) Field of Classification Search
CPC ................ B60W 30/1819; C10G 2/30; C10G 2300/1003; C10G 2300/1011; C10G 2300/1022; C10G 2300/202; C10G 2300/4081; C10G 2300/70; C10G 3/42; C10G 3/50; C10G 45/02; C10G 45/26; C10G 45/32; C10G 45/58; C10G 47/00; F16H 61/21; Y02P 30/20
See application file for complete search history.

(56) References Cited

OTHER PUBLICATIONS

International Search Report (PCT/ISA/210) and Written Opinion (PCT/ISA/237) mailed on Mar. 25, 2022, by the European Patent Office as the International Searching Authority for International Application No. PCT/EP2021/086244.

* cited by examiner

PROCESS FOR OPERATING SULFIDED HYDROPROCESSING CATALYST

The present invention relates to a process for operating a process involving a sulfided material catalytically active in hydroprocessing, especially when treating a feedstock comprising low amounts of sulfur.

The upgrading of fossil feedstocks typically involves hydroprocessing in the presence of a catalytically active material comprising sulfided base metals, typically molybdenum or tungsten often in combination with nickel or cobalt. Sulfided base metals are used as they are less expensive and more robust in operation compared to noble metals, which operate in a reduced, sulfur-free, state. As a typical objective of hydroprocessing of fossil feedstocks is the removal of sulfur from the feedstock, maintaining these base metals in the sulfided state has not been a problem.

However, when treating feedstocks with extremely low sulfur content such as many renewable feedstocks and synthetic hydrocarbons this continuous maintenance of the active state of catalytically active materials is not available. As these feedstocks are of high relevance, especially with respect to reducing climate change, it is important to handle this issue. One way of doing this is by providing a sufficient amount of sulfur, either by addition of a sulfiding agent such as di-methyl di-sulfide (DMDS) or by addition of an amount of feedstock comprising sulfur, such as fossil feedstock. However, since sulfur is undesired in the product, such added sulfur must also be removed, e.g. after capture on an adsorbent or in an amine wash.

According to the present invention a method for maintaining the sulfur in the process by separation and recycle of a stream comprising sulfur is proposed.

In the following a hydrocarbonaceous feedstock shall be used to signify a feedstock rich in molecules comprising hydrogen and carbon, but possibly also other elements, such as oxygen, sulfur and nitrogen.

In the following a hydroprocessing process shall be used to signify any process reacting a hydrocarbonaceous feedstock or intermediate product in the presence of a catalytically active material and hydrogen.

In the following a hydrotreatment process shall be used to signify any process treating a hydrocarbonaceous feedstock or intermediate product in the presence of a catalytically active material and hydrogen, in which the objective and dominant reaction is conversion by addition of hydrogen in the existing hydrocarbon structure, typically while either removing heteroatoms such as sulfur, oxygen or nitrogen or while saturating olefinic bonds. Hydrotreatment may have the effect of rearranging the structure of some hydrocarbons, but it is not the primary objective or effect of hydrotreatment.

In the following processes and equipment for separation of a multi-phase stream in three phases shall be used to signify single or multiple equipment, receiving a multi-phase stream, and, optionally after cooling the multi-phase stream, providing a gas stream, a polar stream and a non-polar stream. The polar stream may be water, and the multi-phase stream may be a two-phase stream, the gas phase of which after optional cooling condenses at least partially, to provide a three-phase stream.

A broad aspect of the present disclosure relates to a process for hydroprocessing of a hydrocarbonaceous feedstock stream and a source of sulfur comprising the steps of directing said hydrocarbonaceous feedstock stream to contact a material catalytically active in hydroprocessing thus providing a hydroprocessed stream, cooling said hydroprocessed stream to produce a three-phase hydroprocessed stream and separating said three-phase hydroprocessed stream in a purified hydrocarbon stream, sour water and a separation off-gas, separating said sour water in a purified water stream and sour stream, directing one or both of said sour stream or said separation off-gas as a sulfur source for step a, either directly or after separation it to contact said material catalytically active in hydroprocessing or to be combined with said hydroprocessed stream prior to separating said hydroprocessed stream the process being characterized in said material catalytically active in hydroprocessing comprising at least one base metal from Group 5, 8, 9 or 10 of the periodic table in sulfided state. This has the benefit of minimizing or even avoiding the need for addition of sulfur to keep the catalytically active material in the active sulfided state.

A similar broad aspect of the present disclosure relates to a process for hydroprocessing of a hydrocarbonaceous feedstock stream comprising the steps of directing said hydrocarbonaceous feedstock stream to contact a material catalytically active in hydroprocessing thus providing a hydroprocessed stream separating said three-phase hydroprocessed stream in a purified hydrocarbon stream, sour water and a separation off-gas, separating said sour water in a purified water stream and sour stream, directing said sour stream as a liquid sour recycle stream either to contact said material catalytically active in hydroprocessing or to be combined with said hydroprocessed stream prior to separating said hydroprocessed stream the process being characterized in said material catalytically active in hydroprocessing comprising at least one base metal from Group 5, 8, 9 or 10 of the periodic table in sulfided state. This has the benefit of minimizing or even avoiding the need for addition of sulfur to keep the catalytically active material in the active sulfided state.

In a further embodiment said hydrocarbonaceous feedstock stream comprises a low amount of sulfur such as less than 300 $ppm_w$, such as from 0 $ppm_w$ sulfur, 0.1 $ppm_w$ sulfur or 1 $ppm_w$ sulfur to 10 $ppm_w$ sulfur or 50 $ppm_w$ sulfur, 100 $ppm_w$ sulfur or 200 $ppm_w$ sulfur. A low amount of sulfur may in general be defined as less sulfur than is required for maintaining the material catalytically active in hydroprocessing, after addition of recycle streams but without addition of recycle streams comprising sulfur, This has the associated benefit of avoiding or minimizing the required addition of sulfur, e.g. in the form of DMDS or fossil feedstock to such a feedstock stream in order to maintain the sulfided state of the catalytically active material.

In a further embodiment said hydrocarbonaceous feedstock is a feedstock rich in oxygenates, comprising from at least 1 wt % O, at least 5 wt % O, at least 10 wt % O to less than 70 wt % O, less than 50 wt % O or less than 30 wt % O on elemental basis, such as a feedstock originating from biological material or a feedstock originating from a recycled waste, optionally after a thermal and/or catalytic degradation process. This has the associated benefit that hydrocarbonaceous feedstocks of renewable origin typically contain very little or no sulfur, and that such a process treating such feedstocks will require maintaining the activity of the sulfided material catalytically active in hydrodeoxygenation and other hydroprocessing reactions by addition of sulfur.

In a further embodiment said hydrocarbonaceous feedstock is a synthetic hydrocarbonaceous feedstock, such as a product of a Fischer-Tropsch process comprising from 1 wt % to 20 wt % O in alcohols, and at least 80% molecules having a non-branched carbon skeleton structure or a product of a process synthesizing hydrocarbons from reactive oxygenates, comprising at least 20% monoaromatics, and where the ratio of 1,2,4-trimethyl benzene to 1,2,3-trimethyl benzene is above 6:1, including a methanol to gasoline process. This has the associated benefit that feedstocks of synthetic origin typically contain very little or no sulfur, and that such a process treating such feedstocks will require maintaining the activity of the sulfided material catalytically active in hydrodeoxygenation, hydrocracking and other hydroprocessing reactions by addition of sulfur. The term non-branched carbon skeleton structure indicates molecules, in which the carbon skeleton is linear, i.e. homologue to n-paraffins.

In a further embodiment separating said hydroprocessed stream involves a product stripping process, wherein a first stripping medium is directed to contact the hydroprocessed stream to provide a stripped product and a product stripper off-gas. This has the associated benefit of a stripping process being highly efficient in driving the sulfur out of the hydroprocessed stream, such that the maximum amount of sulfur is available for recycle and the purified hydrocarbon stream will have a minimal content of sulfur—thus minimizing downstream catalyst poisoning and the amount of sulfur in the final product.

In a further embodiment the first stripping medium is taken from the group comprising hydrogen, steam and reboiled hydroprocessed stream. The use of steam has the benefit of being compatible with the water already being a product of the hydrodeoxygenation of oxygenates, such as those present in the feedstock. The use of hydrogen has the benefit of hydrogen being well suited for use as stripping media, being available and compatible with the overall process. The use of a reboiled hydroprocessed stream, such as a hydroprocessed stream heated in the stripper benefits from availability and compatibility of this stream.

In a further embodiment separating said sour water involves a sour water stripping process, wherein a second stripping medium is directed to contact the sour water. This has the associated benefit of a stripping process being highly efficient in driving the sulfur out of the sour stream, such that a maximum amount of sulfur is available for recycle via the sulfur rich stream and the purified liquid stream will have a minimal content of sulfur—thus providing a liquid stream highly suited as washing water.

In a further embodiment the second stripping medium is either steam or reboiled sour water. This has the associated benefit that steam provided externally or by reboiling is well suited for use as stripping medium as it is compatible with the water already present in the sour water.

In a further embodiment said sour water further comprises one or more streams comprising sulfur, such as washing water from washing said separation off-gas, a purge gas and/or a $H_2$ rich gas. This has the associated benefit of these further streams being in need of purification and the presence of sulfur enabling an increased amount of recycled sulfur.

In a further embodiment said sour water stripping process involves condensing the stripper off-gas by cooling to provide a sour water condensate and directing an amount of said sour water condensate as liquid sour recycle and directing an amount of said sour water condensate gas as reflux for the stripping process. This has the associated benefit of providing a liquid sour recycle with a high concentration of $H_2S$.

In a further embodiment said product stripping process involves condensing the product stripper off-gas by cooling, directing an amount of basic aqueous solution to contact said cooled product stripper off-gas to provide a polar product stripper condensate and a non-polar product stripper condensate and directing the polar product stripper condensate to be combined with said sour water. The basic aqueous solution may be ammonia, sodium hydroxide or any other base, which is inexpensive and/or available in the process. The strength of the basic aqueous solution may beneficial be such that the pH of the product stripper condensate is above 7. This has the associated benefit of providing a liquid sour recycle with a high concentration of $H_2S$.

A further aspect of the present disclosure relates to a process plant comprising a hydroprocessing reactor, having an inlet and an outlet, a first product separation section configured for separation of a product in three phases, having an inlet, a gas outlet, a non-polar liquid outlet and a polar liquid outlet, a second product separation section configured for separation of a product in three phases, having an inlet, a gas outlet, a purified hydrocarbon outlet and a sour water outlet, a sour water separation section, having an inlet, a gas outlet, a purified water outlet and a sour water condensate outlet, wherein said hydroprocessing reactor outlet is in fluid communication with the first product separation section inlet, wherein the first product separation section gas outlet is in fluid communication with the hydroprocessing reactor inlet, wherein the first product separation section non-polar liquid outlet is in fluid communication with the second product separation section inlet, wherein said polar liquid outlet and said sour water outlet are in fluid communication with the sour water separation section inlet, wherein the sour water condensate outlet is in fluid communication with either the inlet of said hydroprocessing reactor, or with said first product separation section inlet, and wherein the process plant is configured for directing a feedstock to the hydroprocessing reactor inlet and configured for withdrawing a purified hydrocarbon from said purified hydrocarbon outlet. This has the associated benefit of such a process plant being efficient in hydroprocessing a hydrocarbon comprise little or no sulfur with a sulfided hydroprocessing catalyst, especially if implementing a method as described in the previous embodiments.

The conversion of oxygenates to paraffins is a common process for production of renewable transportation fuels. The oxygenate feedstock typically comprises one or more oxygenates taken from the group consisting of triglycerides, fatty acids, resin acids, ketones, aldehydes or alcohols where said oxygenates originate from one or more of a biological source and a thermal and/or catalytic degradation process, including a gasification process or a pyrolysis process, such that a wide range of feedstocks, especially of renewable origin may be converted into hydrocarbon. This includes feedstocks originating from plants, algae, animals, fish, vegetable oil refining, other biological sources, domestic waste, industrial biological waste like tall oil or black liquor as well as non-biological waste comprising suitable compositions, such as plastic fractions, typically after a thermal and/or catalytic degradation process.

In addition, sulfur-free hydrocarbons may be provided synthetically, typically from a sulfur-free synthesis gas via Fischer-Tropsch synthesis, methanol-based hydrocarbon synthesis and other processes synthesizing hydrocarbons from reactive oxygenates, e.g. methanol, as well as further hydrocarbon synthesis processes, with the associated benefit of feedstocks provided from such synthetic processes.

A common feature for many such renewable feedstocks and synthetic hydrocarbons is the absence or very low level of sulfur, such as below 100 $ppm_w$, or even lower.

The production of hydrocarbon products typically require one or more hydroprocessing steps; hydrotreatment for removing heteroatoms and saturating double bonds, hydroisomerization for adjusting hydrocarbon molecule structure and hydrocracking for reducing hydrocarbon molecular weight.

During hydroprocessing, oxygenates are combined with an excess of hydrogen and react in hydrodeoxygenation processes as well as decarboxylation and decarbonylation processes, where water, carbon dioxide and carbon monoxide are released from the oxygenates, and an amount of carbon dioxide is converted to carbon monoxide by the water/gas shift process. Typically, around 10 wt % of the oxygenate feedstock is oxygen, and thus a significant amount of the product stream will be water, carbon dioxide and carbon monoxide. In addition, an amount of light hydrocarbons (especially methane and propane) may also be present in the product stream, depending on the nature of the feedstock and the side reactions occurring. Hydrotreatment may also involve extraction of other hetero-atoms and/or saturation of double bonds.

Typically, hydrotreatment, such as deoxygenation and hydrogenation, involves directing the feedstock stream comprising oxygenates to contact a catalytically active material comprising sulfided molybdenum, or possibly tungsten, and/or nickel, supported on a carrier comprising one or more refractory oxides, typically alumina, but possibly silica or titania. The support is typically amorphous. The catalytically active material may comprise further components, such as boron or phosphorous. The conditions are typically a temperature in the interval 250-400° C., a pressure in the interval 30-150 Bar, and a liquid hourly space velocity (LHSV) in the interval 0.1-2. The deoxygenation will involve a combination of hydrodeoxygenation producing water and decarboxylation producing $CO_2$ with a selectivity which, depending on conditions and the nature of the catalytically active material may vary from above 90% hydrodeoxygenation to above 90% decarboxylation. Deoxygenation is typically exothermal, and with the presence of a high amount of oxygen, the process may involve intermediate cooling e.g. by quenching with cold hydrogen, feed or product. The feedstock may preferably contain an amount of sulfur to ensure sulfidation of the metals, in order to maintain their activity. If the feedstock stream comprising oxygenates comprises less than 10, 50 or 100 $ppm_w$ sulfur, a sulfide donor, such as dimethyldisulfide (DMDS) has typically been added to the feed.

Especially when treating fatty acids, triglycerides and Fischer-Tropsch products, the deoxygenation process provides a product rich in linear alkanes, having poor cold flow properties, and therefore the deoxygenation process may be combined with a hydroisomerization process, with the aim of improving the cold flow properties of products, and/or a hydrocracking process, with the aim of adjusting the boiling point of products.

For other processes, such as the methanol to hydrocarbons synthesis, the nature of the hydrocarbons produced may require other post-treatment hydroprocessing processes, such as isomerization to shift the product from durene to isodurene and pseudocumene to mesitylene, with the benefit of improved cold flow properties and octane number ratings or hydrogenation to saturation excessive olefins.

Typically, rearrangement of molecular structure by hydroisomerization involves directing an intermediate deoxygenated product stream feedstock to contact a material catalytically active in hydroisomerization comprising an active metal (either elemental noble metals such as platinum and/or palladium or sulfided base metals such as nickel, cobalt, tungsten and/or molybdenum), an acidic support (typically a molecular sieve showing high shape selectivity, and having a topology such as MOR, FER, MRE, MWW, AEL, TON and MTT) and a refractory support (such as alumina, silica or titania, or combinations thereof). The catalytically active material may comprise further components, such as boron or phosphorous. The conditions are typically a temperature in the interval 250-350° C., a pressure in the interval 20-100 Bar, and a liquid hourly space velocity (LHSV) in the interval 0.5-8. Isomerization is substantially thermally neutral and hydrogen is typically not consumed in the isomerization reaction, although a minor amount of hydrocracking side reactions consuming hydrogen may occur. The active metal on the material catalytically active in isomerization may either be a base metal or a noble metal. If it is a noble metal, the deoxygenated feedstock is typically purified by gas/liquid separation section often involving a stripping process, which typically will use hydrogen as stripping medium, but other stripping media such as steam may also be used, to reduce the content of sulfur to below 1-10 $ppm_w$. If the active metal is a base metal, the feed to hydroisomerization may preferably contain an amount of sulfur to ensure sulfidation of the metals, in order to maintain their activity.

Hydrocracking will adjust the cold flow properties as well as the boiling point characteristics of a hydrocarbon mixture, by cracking large molecules into smaller. Typically, hydrocracking involves directing an intermediate feedstock to contact a catalytically active material comprising an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU) and a refractory support (such as alumina, silica or titania, or combinations thereof). The catalytically active material may comprise further components, such as boron or phosphorous. While this overall composition is similar to the material catalytically active isomerization the difference is typically the nature of the acidic support, which may be of a different structure (even amorphous silica-alumina) or have a different—typically higher—acidity e.g. due to silica:alumina ratio. The conditions are typically a temperature in the interval 250-400° C., a pressure in the interval 30-150 Bar, and a liquid hourly space velocity (LHSV) in the interval 0.5-8, optionally together with intermediate cooling by quenching with cold hydrogen, feed or product.

A hydroprocessed stream comprising hydrocarbons, excess hydrogen and inorganic molecules comprising heteroatoms must be separated in hydrocarbons and molecules—typically gases—comprising heteroatoms. To do this, the hydroprocessed stream is directed to a separation section, which for process scenarios relating to the treatment of fatty acids and triglycerides either will be between a base metal based hydrodeoxygenation reactor and a noble metal based hydroisomerization reactor, or if the material catalytically active in hydroisomerization comprises base metals, downstream the hydroisomerization reactor. The process may also comprise one or more other conversion steps, such as hydrocracking or hydrodearomatization, and depending on the sequence of these steps and the catalytically active metals used, the skilled person will be aware of the possible positions for introducing a separation section with the purpose of withdrawing a recycle gas stream.

The composition of the hydroprocessed stream will depend on the composition of the hydrocarbon feedstock. Synthetic hydrocarbons will typically have very low presence of heteroatoms, except Fischer-Tropsch products which like hydrocarbonaceous feedstock of biological origin comprises oxygenates, which during hydroprocessing will form water and to some extent carbon oxides. The hydroprocessed stream may therefore contain significant amounts of water and some carbon oxides, and similarly the presence of nitrogen in the hydrocarbonaceous feedstock will result in ammonia in the hydroprocessed stream. Added sulfur as well as any sulfur in the hydrocarbonaceous feedstock will be present as hydrogen sulfide in the hydroprocessed stream, and finally an excess amount of hydrogen will pass unreacted to the hydroprocessed stream.

EP 2 684 938 A2 discloses a process in which sulfur is continuously added to the hydrocarbon feed, which is associated with a process cost.

Commonly the separation of the hydroprocessed stream will involve multiple steps. If the temperature is below the water dew point, the hydroprocessed stream will typically be a three-phase stream, and the first separation step will be a high pressure cold separator, separating a first vapor stream from a (often two phase) liquid. If the hydroprocessed stream does not contain water as a product, wash water (or steam) may be added and condensed with e.g. $NH_3$ and $H_2S$ dissolved in the condensed water. The two liquid phases are separately directed to a low pressure cold separator, which typically also is a three way separator, providing a hydrogen rich gas stream (typically originating from the hydrogen dissolved in the oil), a non-polar hydrocarbon product stream and a sour water stream comprising water produced by hydrodeoxygenation as well as water soluble impurities, such as $H_2S$ and $NH_3$. The hydrocarbon product stream is directed to a product stripper for separating off-gas (mainly light hydrocarbons with 1 to 5 carbons) from a stabilized product, by using a stripping medium which typically is either steam or hydrogen. The sour water stream will typically be separated in a sour water stripper, where the conditions are defined such that the so-called sour gases, ammonia, hydrogen sulfide and carbon oxides are separated from the water by a stripping process employing a stripping medium, typically steam, or by reboiling. The stripped liquid will be relatively pure stripper water and the stripper vapor will be a sour water off-gas stream comprising ammonia, carbon dioxide, hydrogen sulfide and water. A liquid phase of the stripper vapor stream is condensed and the majority used for reflux, to ensure maximum efficiency of the sour water stripper, with the gaseous of sour water off-gas being withdrawn and directed to purification typically in an amine absorber tower, a solid adsorbent or a caustic scrubber, for collecting hydrogen sulfide ammonia and carbon oxides. It has now been realized that this stream of hydrogen sulfide may contribute to maintaining catalyst sulfidation if an amount of condensed sour water off-gas stream is not used reflux in the stripper column, but instead directed as process recycle to an upstream position, such as the high pressure cold separator either together with the hydroprocessed stream or in a separate inlet. The vapor outlet of the high pressure cold separator will be a vapor stream, rich in hydrogen as well as hydrogen sulfide, which may be recycled to feed the hydrotreater, to maintain the hydrotreater catalyst sulfided and thus active.

An alternative to a sour water stripper may be an absorption/desorption system, with a solid or liquid material having affinity for sulfur, and a possibility to provide a controlled release of the sulfur by temperature or flushing, or by reaction with an appropriate salt for collecting sulfide by precipitation.

In the process of collecting $H_2S$ from gaseous and liquid streams a further aspect is pH. As $H_2S$ is an acid, it is more soluble in bases, and conveniently streams rich in $NH_3$ are commonly available in hydroprocessing and may beneficially be used to aid collection of $H_2S$. Alternatively, $NH_3$ or other bases may be added with the purpose of providing basic conditions for collecting $H_2S$. In a related fashion, the release of $H_2S$ from aqueous solutions may also be aided by addition of acids to neutralize or acidify the solution, to aid the release of $H_2S$.

As the amount of sulfur in the process is moderate, it is beneficial to maximize the amount of sulfur recycled by analyzing the streams in which sulfur leaves the process. It is found that an amount of hydrogen sulfide may also be present in the off-gas from the product stripper, and by introducing an amount of water as reflux—especially if it is basic, e.g. if it comprises an amount of ammonia—hydrogen sulfide may be collected from the product stripper overhead stream. Similarly, an amount of basic stripper water, after addition of ammonia may be used to wash the hydrogen rich gas and the purge gas in the low pressure cold separator.

Compared to recycling the sour water off-gas recycling the sour water condensate stream has the benefit that pressurizing the liquid recycle stream will be much simpler than pressurizing the off-gas stream. Recycling the sour water condensate stream as a liquid upstream the reactor is also a possibility with the benefit of simplicity, but this stream will typically comprise ammonia, which may have a negative influence on catalyst activity, and therefore there will be processes where this solution is not applicable.

For simplicity figures are shown without all process equipment, especially heat exchange circuits.

Figure 1:
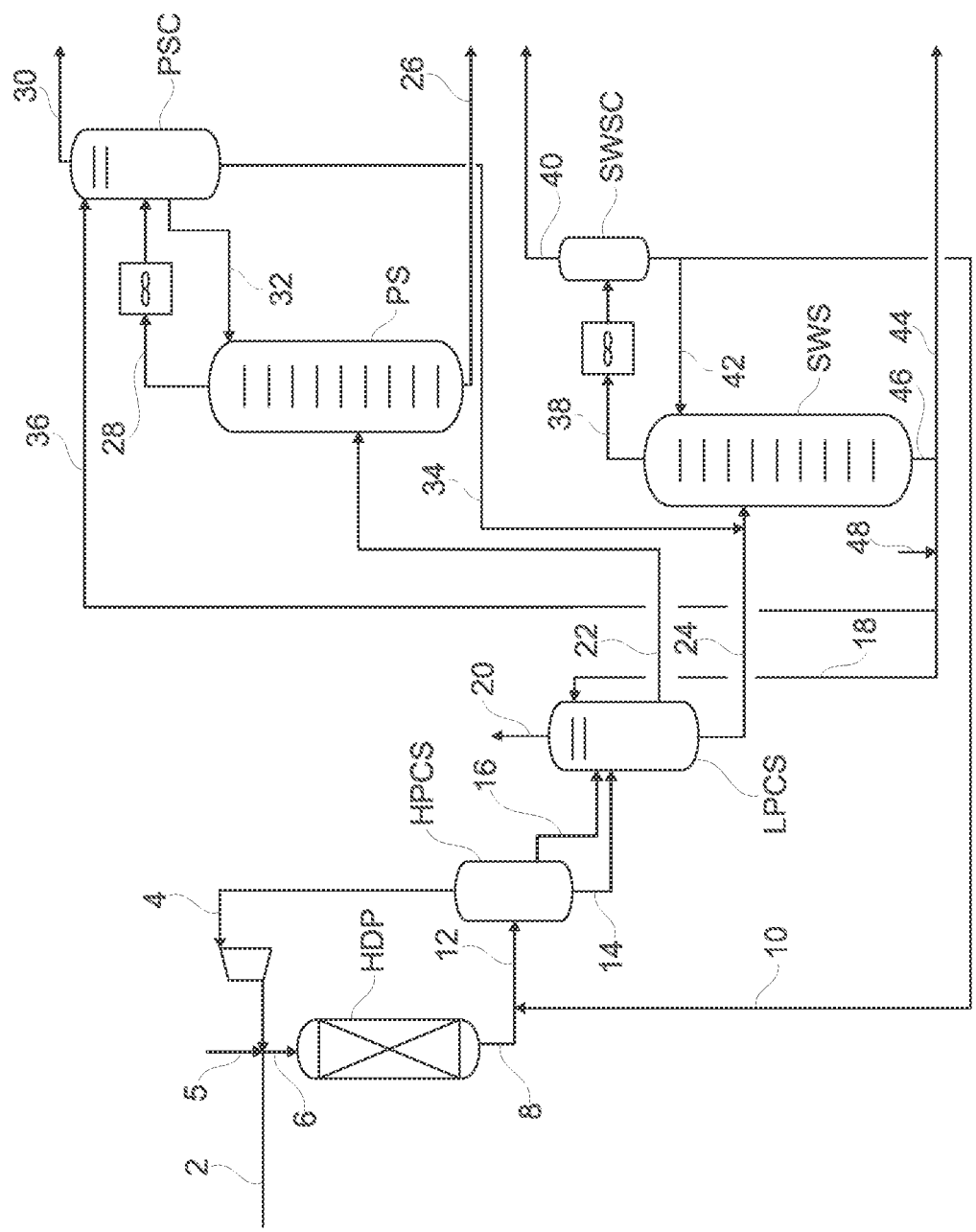
FIG. 1 shows a hydroprocessing process according to the present disclosure where sulfur is recycled within the process.

FIG. 1 illustrates a process according to the present disclosure in which a hydrocarbonaceous feedstock stream 2 with a limited sulfur content, such as a mixture rich in oxygenates, is together with a recycle gas stream 4, and an amount of make-up hydrogen 5, directed as a total feed stream to a hydroprocessing reactor HDP, comprising a material catalytically active in hydroprocessing, to provide a hydrotreated product stream 8. In the case of a feedstock rich in oxygenates, the catalytically active material is active in hydrodeoxygenation, and for other feedstocks, the catalytically active material may be active in other hydrotreatment processes, hydroisomerization or hydrocracking. The hydrotreated product stream 8 is combined with a liquid sour recycle stream 10, to provide a sour product stream 12, and (after cooling) directed to a high pressure cold separator HPCS, where the sour product stream 12 is separated in a polar liquid stream 14, a non-polar liquid stream 16 and a vapor stream which is directed as the recycle gas stream 4 which will comprise unreacted hydrogen, as well an amount of hydrogen sulfide and ammonia, present in the liquid sour recycle stream 10. Both liquid streams 14, 16 and a basic stripper water stream 18 are directed to a downstream low pressure cold separator LPCS. The input to the low pressure cold separator LPCS is separated in three phases; a hydrogen rich gas stream 20, mainly comprising hydrogen and methane dissolved in the non-polar liquid stream 16, a non-polar product stream 22 and a polar sour water stream 24.

The non-polar product stream 22 is directed to a product stripper PS, in which a product stream 26 is separated from a stripper vapor 28, which in a product stripper condenser PSC is separated in product stripper off-gas 30, non-polar reflux 32 and product stripper condensate 34 are separated. The product stripper condenser PSC receives an amount of basic stripper water stream 36 to aid the withdrawal of hydrogen sulfide from the stripper vapor 28. Non-polar reflux 32 is directed to the product stripper PS to enhance the separation process.

The sour water stream 24 is together with product stripper condensate 34 directed to a sour water stripper SWS, where it is separated in stripper water 46 and a sour water stripper vapor stream 38. The sour water stripper vapor stream 38 is in sour water stripper condenser SWSC separated in a sour water stripper off-gas 40 and a sour water condensate, split in a sour water stripper reflux stream 42 and said liquid sour recycle stream 10. The stripper water 46 is split in a purge fraction 44 and a fraction to which ammonia 48 is added, forming a basic stripper water stream, which is split in the basic stripper water stream 18 directed to the low pressure cold separator LPCS and the basic stripper water stream 36 directed to the product stripper PS respectively.

The hydrogen rich gas stream 20, product stripper off-gas 30 and sour water stripper off-gas 40 may contain minor amounts of hydrogen sulfide and possibly one or more of the three streams may have to be directed to purification.

Commonly, a diluent such as an amount of cooled recycled product or hydrocarbonaceous feedstock of other origins, may be combined with the feedstock. The objective of this will be to control the temperature, by functioning as a heat sink, such that the released heat from the exothermic hydrotreatment, especially hydrodeoxygenation reactions will be distributed over a higher amount of feedstock. The temperature may also be controlled by stepwise addition of cold hydrogen in the reactors, also known as quench.

In a further embodiment, the product stream may be directed to a downstream unit, for hydrocracking, isomerization or both, to adjust the boiling point and/or cold flow properties respectively. In this case, the catalytically active material for these reactions will typically be based on elemental noble metals.

In an alternative embodiment, one or both of hydrocracking and isomerization may be carried out in the same reactor or the same reactor section as hydrodeoxygenation. In this case, the catalytically active material for these reactions will typically be based on sulfided base metals.

Embodiments where base metal hydrocracking or isomerization upstream separation and noble metal hydrocracking or isomerization downstream separation are of course also feasible.

Embodiments involving alternative layouts known as reverse staging may also be used. Here a unit of the process will only receive recycled product from other section(s), typically after separation of commercially valuable product from the recycled product.

Embodiments where make up hydrogen gas is added in other positions or where recycle gas is combined with hydrogen rich gas from downstream units are also feasible.

Figure 2:
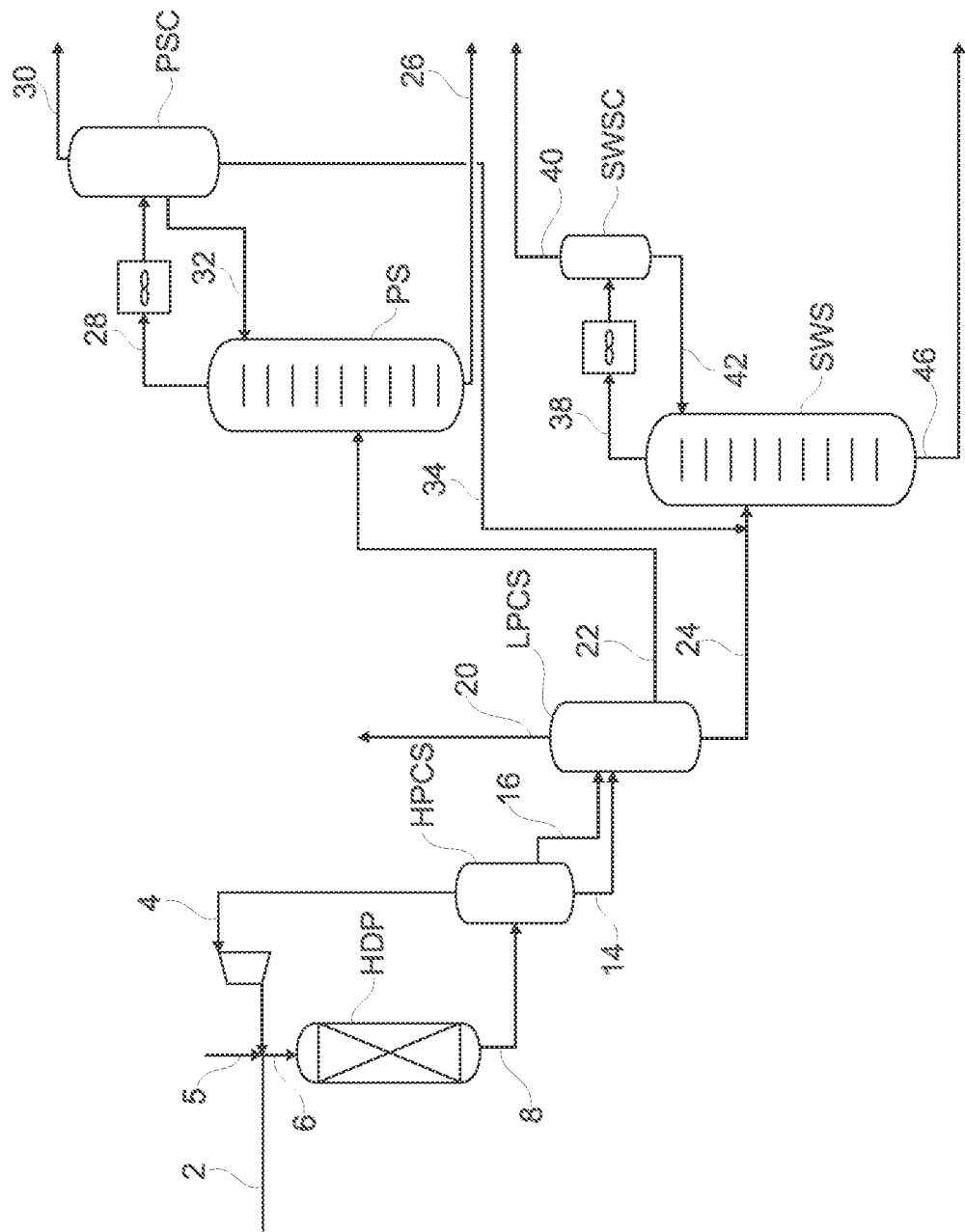
FIG. 2 shows a hydroprocessing process according to the prior art, where sulfur is withdrawn from the process.

FIG. 2 illustrates a process according to the prior art, a hydrocarbonaceous feedstock stream 2, such as a mixture rich in oxygenates, is together with a recycle gas stream 4, and an amount of make-up hydrogen 5, directed as a total feed stream to a hydroprocessing reactor HDP, comprising a material catalytically active in hydroprocessing, to provide a hydrotreated product stream 8. In this process configuration the hydrocarbonaceous feedstock stream must have a sufficient sulfur content, e.g. by addition of a sulfur source. In the case of a feedstock rich in oxygenates, the catalytically active material is active in hydrodeoxygenation, and for other feedstocks, the catalytically active material may be active in other hydrotreatment processes, hydroisomerization or hydrocracking. The hydrotreated product stream 8 is (after cooling) directed to a high pressure cold separator HPCS, where it is separated in a polar liquid stream 14, a non-polar liquid stream 16 and a vapor stream which is directed as the recycle gas stream 4, which will comprise unreacted hydrogen and impurities, which may taken out as a purge. Both liquid streams 14, 16 are directed to a downstream low pressure cold separator LPCS. The input to the low pressure cold separator LPCS is separated in three phases; a hydrogen rich gas stream 20, mainly comprising hydrogen and methane dissolved in the non-polar liquid stream 16, a non-polar product stream 22 and a polar sour water stream 24.

The non-polar product stream 22 is directed to a product stripper PS, in which a product stream 26 is separated from a stripper vapor 28, which in a product stripper condenser PSC is separated in product stripper off-gas 30, non-polar reflux 32 and product stripper condensate 34 are separated. Non-polar reflux 32 is directed to the product stripper PS to enhance the separation process.

The sour water stream 24 is together with product stripper condensate 34 directed to a sour water stripper SWS, where it is separated in stripper water 46 and a sour water stripper vapor stream 38. The sour water stripper vapor stream 38 is in sour water stripper condenser SWSC separated in a sour water stripper off-gas 40 and a condensed liquid sour water stripper reflux stream 42 The stripper water 46 is directed to further water treatment in the plant.

The hydrogen rich gas stream 20, product stripper off-gas 30 and sour water stripper off-gas 40 may contain hydrogen sulfide and typically all three streams are directed to purification.

The invention claimed is:

1. A process for hydroprocessing of a hydrocarbonaceous feedstock stream comprising the steps of:
   a. directing said hydrocarbonaceous feedstock stream and a source of sulfur to contact a material catalytically active in hydroprocessing thus providing a hydroprocessed stream;
   b. cooling said hydroprocessed stream to produce a three-phase hydroprocessed stream and separating said three-phase hydroprocessed stream in a purified hydrocarbon stream, sour water and a separation off-gas;
   c. separating said sour water in a purified water stream and sour stream;
   d. directing one or both of said sour stream or said separation off-gas as a sulfur source for step a, either directly or after separation it to contact said material catalytically active in hydroprocessing or to be combined by combination with said hydroprocessed stream prior to step b;
   said material catalytically active in hydroprocessing comprising at least one base metal from Group 5, 8, 9 or 10 of the periodic table in sulfided state.

2. A process according to claim 1, wherein said hydrocarbonaceous feedstock stream comprises less than 300 $ppm_w$ sulfur.

3. A process according to claim 1, wherein said hydrocarbonaceous feedstock is a feedstock rich in oxygenates, comprising from at least 1 wt % O on elemental basis.

4. A process according to claim 1, wherein said hydrocarbonaceous feedstock is a synthetic hydrocarbonaceous feedstock, such as a product of a Fischer-Tropsch process comprising from 1 wt % to 20 wt % O in alcohols, and at least 80% molecules having a non-branched carbon skeleton structure or a product of a process synthesizing hydrocarbons from reactive oxygenates, comprising at least 20% monoaromatics, and where the ratio of 1,2,4-trimethyl benzene to 1,2,3-trimethyl benzene is above 6:1.

5. A process according to claim 1, wherein said step b) involves a product stripping process, wherein a first stripping medium is directed to contact the hydroprocessed stream to provide a stripped product and a product stripper off-gas.

6. A process according to claim 5, wherein the first stripping medium is taken from the group comprising hydrogen, steam and reboiled hydroprocessed stream.

7. A process according to claim 1, wherein step c) involves a sour water stripping process, wherein a second stripping medium is directed to contact the sour water.

8. A process according to claim 7, wherein the second stripping medium is either steam or reboiled sour water.

9. A process according to claim 1, wherein said sour stream further comprises one or more streams comprising sulfur, such as washing water from washing said separation off-gas, a purge gas and/or a $H_2$ rich gas.

10. A process according to claim 7, wherein said sour water stripping process involves condensing the sour water stripper off-gas by cooling to provide a sour water condensate and directing an amount of said sour water condensate as liquid sour recycle and directing an amount of said sour water condensate as reflux for the stripping process.

11. A process according to claim 5, wherein said product stripping process involves condensing the product stripper off-gas by cooling, directing an amount of basic aqueous solution to contact said cooled product stripper off-gas to provide a polar product stripper condensate and a non-polar product stripper condensate and directing the polar product stripper condensate to be combined with said sour water.

12. A process plant comprising
a hydroprocessing reactor, having an inlet and an outlet,
a first product separation section configured for separation of a product in three phases, having an inlet, a gas outlet, a non-polar liquid outlet and a polar liquid outlet,
a second product separation section configured for separation of a product in three phases, having an inlet, a gas outlet, a purified hydrocarbon outlet and a sour water outlet,
a sour water separation section, having an inlet, a gas outlet, a purified water outlet and a sour water condensate outlet,
wherein said hydroprocessing reactor outlet is in fluid communication with the first product separation section inlet,
wherein the first product separation section gas outlet is in fluid communication with the hydroprocessing reactor inlet,
wherein the first product separation section non-polar liquid outlet is in fluid communication with the second product separation section inlet,
wherein said polar liquid outlet and said sour water outlet are in fluid communication with the sour water separation section inlet,
wherein the sour water condensate outlet is in fluid communication with either the inlet of said hydroprocessing reactor, or with said first product separation section inlet, and
wherein the process plant is configured for directing a feedstock to the hydroprocessing reactor inlet and configured for withdrawing a purified hydrocarbon from said purified hydrocarbon outlet.

13. A process according to claim 1, wherein step d comprises directing said sour stream as the sulfur source for step a.

* * * * *